March 13, 1951  J. WAROBIEW  2,545,398
FISH LURE
Filed Dec. 9, 1947
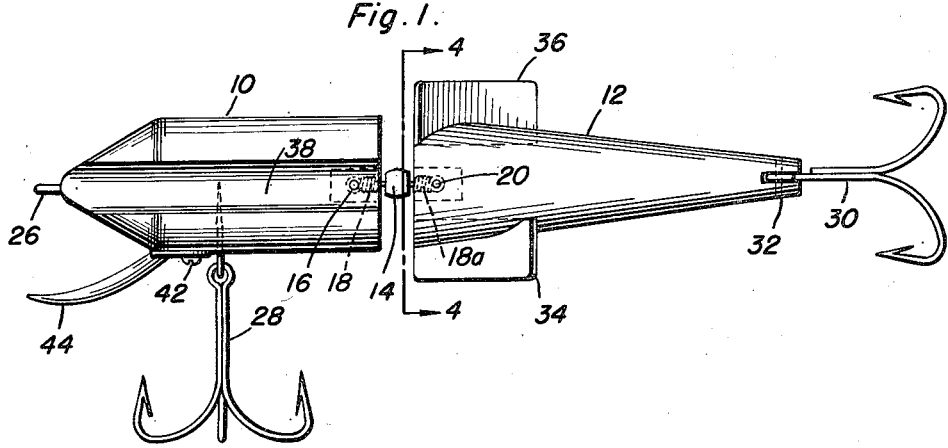
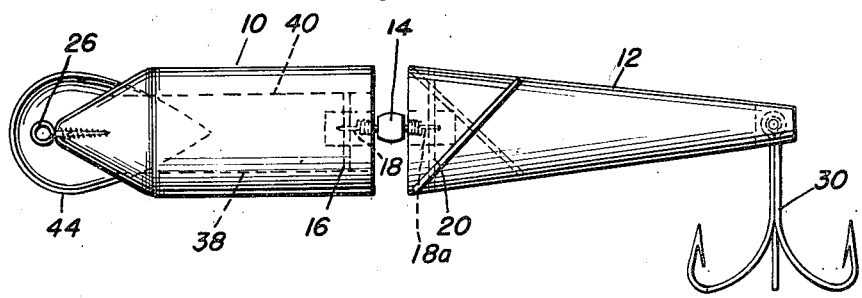
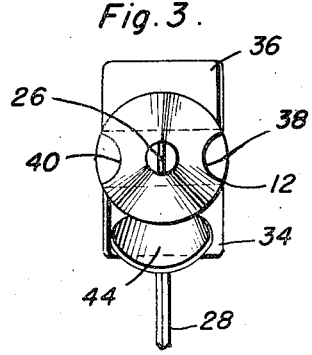
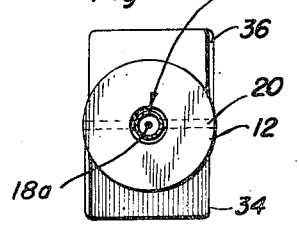
John Warobiew
INVENTOR.
BY *Clarence A. O'Brien*
*and Harvey B. Jacobson*
Attorneys Patented Mar. 13, 1951

2,545,398

UNITED STATES PATENT OFFICE 2,545,398

FISH LURE

John Warobiew, Farrell, Pa.

Application December 9, 1947, Serial No. 790,538

2 Claims. (Cl. 43—42.16)

This invention relates to an improvement in artificial bait or lure to which the fish will be attracted by the life-like actions of the latter when in use.

An object of this invention is to provide a bait composed of a body and tail section swively connected so that the tail section will have a free darting and wobbling action.

Another object of this invention is to provide fins formed intergally on the tail section and forming a propeller that will rotate the tail section and produce a churn in the water to simulate the action of a disabled or injured fish.

Another object of this invention is to provide grooves in the sides of the body section to provide a passageway for the water to actuate the propeller.

Another object of this invention is to provide a body plate for forcing the water through the side grooves.

Another object of this invention is to provide an artificial bait and hook which will be inexpensive to manufacture and will be convenient and advantageous and highly efficient in operation.

With these and other objects in view, the invention consists in the construction and novel combination of parts fully described hereinafter, illustrated in the accompanying drawings, wherein:

Figure 1 is a side elevation of the fish lure, in its preferred form;

Figure 2 is a plan view of the structure shown in Figure 1;

Figure 3 is a frontal view of the body section, showing the side grooves and body plate, and;

Figure 4 is a central view taken approximately on the vertical line 4—4 of Figure 1.

Referring to the drawings, the character reference 10 refers to the body section of the lure and 12 to the tail section thereof. A swivel connection 14 is provided between the two sections. More specifically, the swivel is of a well known construction, as shown, and has one of its eye-equipped swivelling pins 18 linked to a cross-rod or shaft 16 carried by the socketed rear end of said body section 10 and its remaining eye-equipped swivelling or coupling pin 18a linked to a similar cross-rod or shaft 20 embedded in the forward socketed end portion of the tail section 12. This arrangement permits rotative movement of the tail section 12 relative to the body section 10 in a well-known manner.

A hook screw 26 is provided in the nose of the body section to which the line is attached.

Suitable fish hooks 28, 30 are provided on the lure, hook 28 being secured by a hook screw to the underside of the body section and hook 30 extending out from the end of the tail section to which it is swively attached by forming it around a transverse shaft 32. Suitable openings are provided in the end section of the tail section to allow the swivelling action of the hook.

Suitable means are provided to spin the tail section and impart a wiggling and darting action to the tail section, whereby the actions of a struggling fish are simulated to serve to captivate and entice fish. This means comprises the swivel connection between the two sections and a propeller carried by the tail section. This propeller includes a pair of angularly disposed fins 34 and 36 formed integrally with the tail section of the lure.

Longitudinally extending grooves 38 and 40 are formed on each side of the body section and prevent rotation of the forward section as well as provide passageways for the water to meet the full surface of the propeller and thereby spin the tail section imparting a free darting action thereto.

A body spoon 44 is secured to the underside of the body section by screw 42 and extends forwardly past the nose of the body section.

As the lure is pulled through the water, the spoon 44 serves to throw the water up and back through the grooves 38 and 40 to impinge against the fins 34 and 36 and thereby rotate the tail section.

It is thought that persons skilled in the art to which the invention relates will be able to obtain a clear and concise understanding of the invention after considering the description in connection with the drawings. Therefore, a more lengthy description is regarded as unnecessary.

It should be understood that various changes in the form, proportion or shape of parts and details in construction such as come within the purview of the appended claims may be resorted to without departing from the spirit of the invention.

Having described the invention what is claimed as new is:

1. A fish lure comprising a body section having diametrically opposite grooves formed in its side walls, said grooves being parallel to the longitudinal axis of said body section, a spoon secured to the underside of the front end of the body section and projecting forwardly thereof, a tail section, laterally extending fins projecting from the forward portion of the tail section and an axially disposed swivel connection between the body section and tail section, said connection permitting rotative movement of the tail section and spacing the sections apart and normally retaining them in axial alignment.

2. A fish lure comprising a body section having longitudinally extending circumferentially spaced diametrically opposite grooves formed in its side walls, a spoon secured to the underside of the front end of said body section and projecting forwardly thereof, an elongated tail section, laterally extending fins projecting from opposite sides of the tail section, the rear portion of the body section and the forward portion of the tail section being formed with axial sockets, anchoring pins transversely positioned in said sockets, and a swivel having swivelly coupled pins extending into said sockets and operatively connected to their respective anchoring pins, said swivel permitting rotative movement of the tail section.

JOHN WAROBIEW.

REFERENCES CITED

The following references are of record in the file of this patent:

UNITED STATES PATENTS

| Number | Name | Date |
|---|---|---|
| 1,521,573 | Myers | Dec. 30, 1924 |
| 1,692,935 | Heddon | Nov. 27, 1928 |
| 1,750,783 | Pemberton | Mar. 18, 1930 |
| 1,832,037 | Meehan | Nov. 17, 1931 |
| 2,196,508 | Steinhoff | Apr. 9, 1940 |

FOREIGN PATENTS

| Number | Country | Date |
|---|---|---|
| 22,000 | Great Britain | 1909 |
| 105,453 | Sweden | Sept. 8, 1942 |
| 842,172 | France | June 7, 1939 |